Feb. 22, 1949. F. R. THOMAS 2,462,145
RECORDING ELECTRIC SIGNALS
Filed March 26, 1945

Inventor
FRANK REGINALD THOMAS
By
Attorney

Patented Feb. 22, 1949

2,462,145

UNITED STATES PATENT OFFICE 2,462,145

RECORDING ELECTRIC SIGNALS

Frank Reginald Thomas, Croydon, England, assignor to Creed and Company Limited, Croydon, England, a British company Application March 26, 1945, Serial No. 584,952
In Great Britain March 31, 1944

1 Claim. (Cl. 346—74)

This invention relates to recording electric signals by electro-chemical means.

It is already known to record electric signals or impulses on specially prepared paper, to which the direct application of an electrical potential causes a chemical or physical change in the prepared paper which produces a visible mark.

In the case of the present invention, however, ordinary unprepared paper in tape or sheet form is used, and is impregnated with a solution of a suitable chemical compound in the recording machine immediately before it travels beneath the styli or other means for applying the recording potential which acts upon the compound to make the visible marks. The tape or sheet may be maintained in continuous motion with respect to the recording point in any convenient manner known in the art.

The invention provides an arrangement for recording electrical signals on ordinary paper, comprising recording means, means for causing relative travel between the paper and the recording means, means in the said recording means for applying to the paper a continuous strip of an electrolytic solution, electrodes in the recording means applied to the paper in the area covered by the said strip of solution, and means for applying signal potentials to the said electrodes in such manner as to produce in the strip of solution a substance of distinguishable colour.

The invention will be explained with reference to the accompanying drawing in which.

Figure 1:
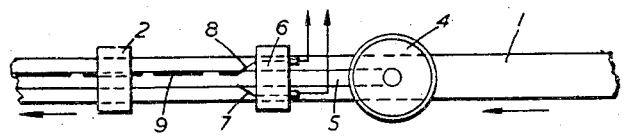
Fig. 1 shows diagrammatically a top view of an arrangement according to the invention for recording signals on paper tape to illustrate the principles.
Figure 2:
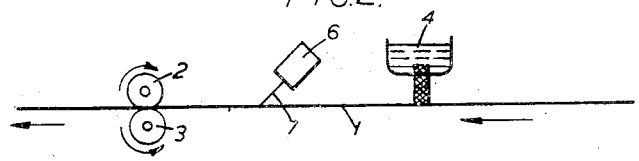
Fig. 2 shows a side view of the arrangement.

Referring to Figs. 1 and 2, a tape 1 of ordinary unprepared paper, such as is commonly used for recording signals in a telegraph receiver, is drawn steadily from right to left by feed rollers 2 and 3 from a tape supply reel (not shown) to the right hand side. The tape first passes a device 4 which applies to the paper a relatively broad continuous strip 5 of an electrolytic solution such as a solution of potassium iodide. The paper wetted by the electrolyte then passes a stylus holder 6 carrying a pair of closely spaced trailing styli 7 and 8, insulated from one another, which are pressed lightly upon the tape in the strip which has been impregnated by the electrolyte. The two styli are connected to the source of the signals which are to be recorded, and the signal potential differences applied to the styli then cause a colouration of the band by the liberation by the positive stylus of iodine (for example) when a potassium iodide electrolyte is used. Thus in the case of Morse signals, the dots and dashes will appear marked on the tape as at 9 in a brown colour on the impregnated strip.

It will be clear that in the space between the device 4 and the styli 7 and 8 the tape will be moistened with the electrolyte, but so far unmarked. The length of this space should be selected in conjunction with the speed of the tape so that the solution has been sufficiently absorbed by the paper by the time it reaches the styli; it should however be still sufficiently moist to provide a conducting path between the styli for the desired electrolytic action to take place satisfactorily for recording. This length will probably best be found by trial.

The styli should be made of conducting material which does not react with the electrolyte; for example platinum or platinum-iridium are suitable.

Having explained the principle of the invention, it is desirable to point out that somewhat similar arrangements have been previously used in which a tape or sheet of paper which has been specially impregnated with the electrolyte or other recording substance, and then dried, is moistened with water or other suitable solvent just previously to the recording operation. It is the great inconvenience of these arrangements that specially impregnated paper must be used. The advantage of the present invention is that ordinary untreated paper, such as is commonly supplied for telegraph recording, is employed the paper being impregnated with the recording electrolytic solution just before it passes under the recording styli, and it does not finally dry until after the recording operation. The paper is thus not simply moistened by the solvent.

Figure 3:
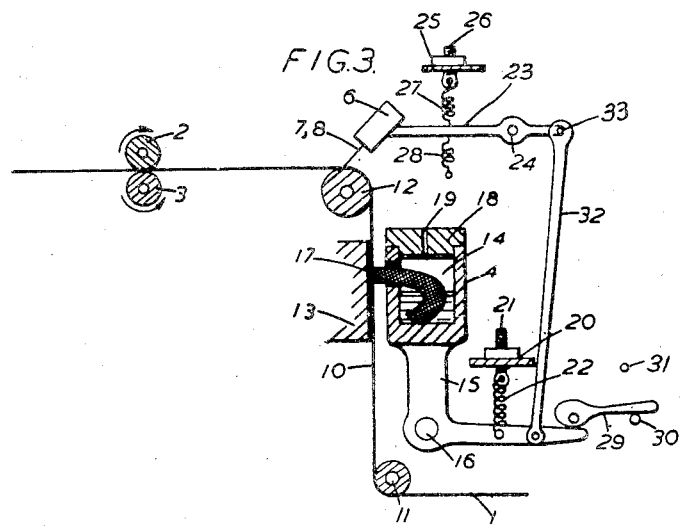
Fig. 3 shows a partly sectional side view of a practical form of the invention.

Fig. 3 shows some practical details of the arrangement explained with reference to Figs. 1 and 2. The paper tape 1 has a vertical portion 10 arranged between two guide rollers 11 and 12. This vertical portion passes in front of a platen 13 opposite which one the other side of the tape is placed the device 4 for applying the electrolytic solution to the tape. The device 4 comprises a reservoir 14 formed at the end of the vertical arm of a bell-crank lever 15 pivoted at 16. The reservoir contains the potassium iodide solution (or other suitable electrolytic solution) and also a wick 17 which passes out through a hole in the side of the reservoir and bears upon the tape which is supported by the platen 13 behind. The reservoir is closed by a cap 18 with a suitable air vent 19.

The pressure of the wick 17 on the tape may be adjusted by means of the thumb nut 20 which acts through a screw 21 and spring 22 on the horizontal arm of the lever 15.

The stylus holder 6 is attached to a lever 23 pivoted at 24, and is arranged so that the styli 7, 8 press the tape lightly on the guide roller 12. The pressure is controlled by a thumb nut 25, screw 26 and springs 27 and 28.

A control lever 29 is provided to act on the lever 15 to swing the device 4 clear of the tape, when the lever 29 is operated from the stop 30 to the stop 31. This is intended for use when the recording machine is not operating.

A link 32 connecting the levers 15 and 23 permits the styli 7 and 8 to be raised off the tape at the same time. Some lost motion is provided in the joint 33 so that when the lever 29 is in the operate position against the stop 30 the pressures of the wick and styli may be independently adjusted by the corresponding thumb nuts. Suitable means (not shown) connected with the lever 29 may be provided for disengaging the feed rollers 2 and 3 from the tape, when the lever is moved to the stop 31.

Figure 4:
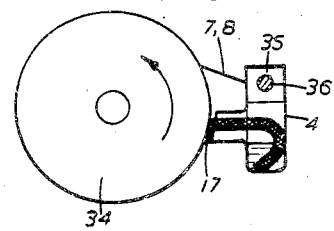
Fig. 4 shows diagrammatically how the invention may be applied to facsimile recording on a paper sheet.

Fig. 4 shows diagrammatically how the same principles might be applied in a facsimile system, in which recording is on a sheet of paper wrapped round a drum 34. The styli 7, 8 are carried on a nut 35 mounted on a lead-screw 36 used for traversing the styli parallel to the axis of the drum in the usual way. The nut 35 also carries the device 4 which holds the electrolytic solution and the wick 17, which applies a strip of the electrolyte to the paper in advance of the styli, in the manner explained with reference to Figs. 1, 2, and 3. Thus a helical strip of electrolyte is applied to the paper and is marked by the positive stylus in accordance with the picture signals applied between the two styli.

It is to be understood that the invention is not limited to the use of a potassium iodide solution as the electrolytic solution for impregnating the paper. Various other iodides, and other metallic salts or mixtures of salts could be used to give a marking by the liberation of a coloured component or compound. The electrolytic solution might also contain a non-electrolyte which is adapted to react with the liberated component to produce the desired colouration.

In the claim which follows, the term "ordinary paper" means paper as ordinarily supplied which has not been already treated in any special way by which it is rendered suitable for electrolytic recording.

What is claimed is:

Arrangement for recording electric signals on ordinary paper, comprising recording means, means for causing relative travel between the paper and the recording means, said paper having a vertically extending portion along the travel path just before arrival at the recording position, said recording means having wick means for applying to only one surface of said paper at its said vertical portion a continuous strip of electrolytic solution at a position close enough to the recording position that the paper surface remains slightly moist as it passes through the recording position, a pair of insulated recording styli and means for applying said styli with light pressure against the said moist surface and series connected therethrough and adjacent the opposite limits of its strip to cause color change when energized.

FRANK REGINALD THOMAS.

REFERENCES CITED

The following references are of record in the file of this patent:

UNITED STATES PATENTS

| Number | Name | Date |
| --- | --- | --- |
| 56,988 | Park | Aug. 7, 1866 |
| 1,350,790 | Delany et al. | Aug. 24, 1920 |
| 1,796,584 | Volmer | Mar. 17, 1931 |
| 2,181,533 | Kline et al. | Nov. 28, 1939 |
| 2,384,722 | Blain | Sept. 11, 1945 |

FOREIGN PATENTS

| Number | Country | Date |
| --- | --- | --- |
| 5,734 | Great Britain | 1913 |
| 301,749 | Great Britain | May 5, 1930 |